United States Patent
Meyer et al.

[11] 3,817,991
[45] June 18, 1974

[54] BENZOXAZOLYL DERIVATIVES, PROCESSES FOR THEIR MANUFACTURE AND THEIR USE

[75] Inventors: Hans Rudolf Meyer; Adolf Emil Siegrist, both of Basel, Switzerland

[73] Assignee: Ciba-Geigy AG, Basel, Switzerland

[22] Filed: June 21, 1971

[21] Appl. No.: 155,306

[52] U.S. Cl............... 260/240 B, 96/1.5, 106/176, 117/33.5 T, 162/162, 252/301.2 W, 252/543, 260/37 R, 260/75 R, 260/78 S, 260/93.5 R, 260/240 CA, 260/240 P, 260/248 CS, 260/307 D, 260/762
[51] Int. Cl............................................. C07d 55/12
[58] Field of Search.................... 260/240 B, 240 CA

[56] References Cited
UNITED STATES PATENTS
| | | | |
|---|---|---|---|
| 3,133,916 | 5/1964 | Duennenberger et al.... | 260/240 CA |
| 3,351,592 | 11/1967 | Siegrist et al................ | 260/240 B |
| 3,586,673 | 6/1971 | Bloom et al.................. | 260/240 CA |

OTHER PUBLICATIONS
Smolin et al., "s-Triazines and Derivatives," frontispage and pages 156–157, Interscience Publishers, Inc. (1959)

*Primary Examiner*—John D. Randolph
*Attorney, Agent, or Firm*—Joseph G. Kolodny; Edward McC. Roberts

[57] ABSTRACT

The invention concerns new benzoxazole derivatives of the formula

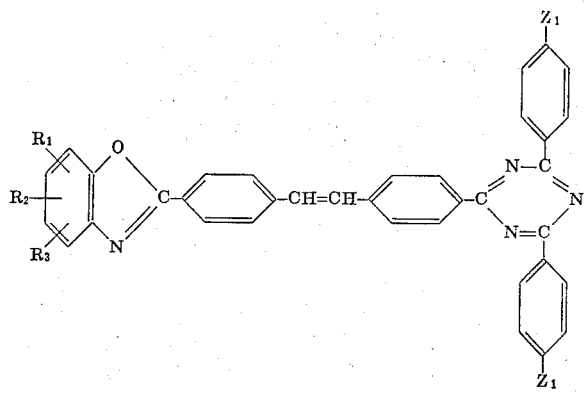

wherein $R_1$ and $R_2$ are identical or different and denote hydrogen, alkyl with one to five carbon atoms or chlorine, $R_3$ denotes hydrogen, alkyl with one to 12 carbon atoms, cyclohexyl, halogen, phenyl, alkylsulphonyl with one to four carbon atoms, phenylalkyl with one to four carbon atoms in the alkyl part, alkoxy with one to four carbon atoms, carboxyl, carboxylic acid esters, in each case with one substituent containing one to 18 carbon atoms, sulphonic acid and sulphonic acid amide, and wherein $R_1$, $R_2$ and $R_3$ in each case occupy the positions 5, 6 or 7, and wherein $Z_1$ denotes a hydrogen atom, a halogen atom, alkoxy, phenyl or an alkyl group containing one to eight carbon atoms. Furthermore the invention deals with a process for their preparation. The compounds of the invention are useful as optical brighteners.

5 Claims, No Drawings

BENZOXAZOLYL DERIVATIVES, PROCESSES FOR THEIR MANUFACTURE AND THEIR USE

The present invention relates to new benzoxazolyl derivatives, processes for the manufacture of these compounds, and their use as optical brighteners for organic materials.

The new benzoxolyl derivatives according to the present invention quite generally correspond to the formula (1)

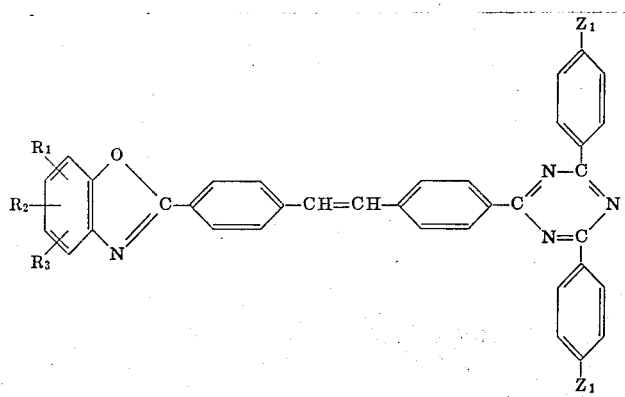

wherein $R_1$ and $R_2$ are identical or different and denote hydrogen, alkyl with one to five carbon atoms or chlorine, $R_3$ denotes hydrogen, alkyl with one to 12 carbon atoms, cyclohexyl, halogen, phenyl, alkylsulphonyl with one to four carbon atoms, alkoxy with one to four carbon atoms, phenylalkyl with one to four carbon atoms in the alkyl part, carboxyl, carboxylic acid esters, in each case with one substituent containing one to 18 carbon atoms, sulphonic acid and sulphonic acid amide, and wherein $R_1$, $R_2$ and $R_3$ in each case occupy the positions 5, 6 or 7, and wherein $Z_1$ denotes a hydrogen atom, a halogen atom, alkoxy, phenyl or an alkyl group containing one to eight carbon atoms.

Where carboxyl groups and sulphonic acid groups are mentioned within the framework of the present invention, the salts of these groups are always to be understood as being included thereby. The alkali, alkaline earth, ammonium and amine salts are preferably used.

For practical purposes, compounds considered within the framework of the present invention are above all those of the formula (2)

(2)

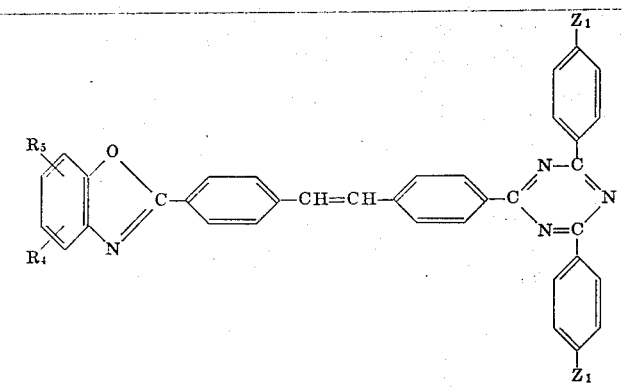

wherein $R_4$ denotes hydrogen, alkyl with one to four carbon atoms or chlorine, $R_5$ denotes hydrogen, alkyl with one to 12 carbon atoms, halogen, phenyl, alkoxy with one to four carbon atoms, carboxyl, carboxylic acid esters, in each case with one substituent containing one to 18 carbon atoms, sulphonic acid or sulphonic acid amide, and wherein $R_4$ and $R_5$ occupy the positions 5, 6 or 7, and wherein $Z_1$ denotes a hydrogen atom, a halogen atom or an alkyl group containing one to eight carbon atoms.

Preferred types of compounds within the framework of the above definitions correspond to the following formulae:

a. Benzoxazolyl derivatives of the formula (3)

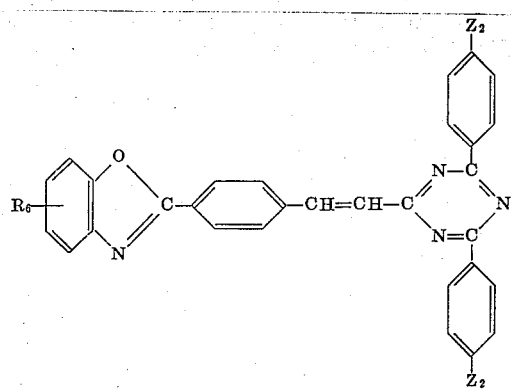

wherein $R_6$ denotes hydrogen, alkyl with one to 12 carbon atoms, chlorine, phenyl, cyclohexyl, alkylsulphonyl with one to four carbon atoms in the alkyl part, phenylalkyl with one to four carbon atoms in the alkyl part, carboxyl or carboxylic acid esters, in each case with one constituent containing one to 18 carbon atoms, and wherein $R_6$ can occupy the position 5, 6 or 7, and wherein $Z_2$ denotes hydrogen or methyl.

b. Benzoxazolyl derivatives of the formula (4)
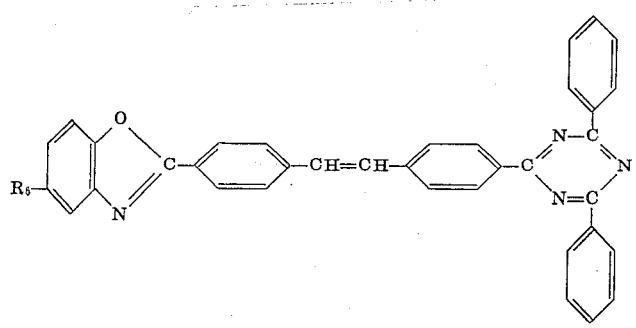

wherein R denotes hydrogen, alkyl with one to 12 carbon atoms, chlorine, phenyl, cyclohexyl, alkylsulphonyl with one to four carbon atoms in the alkyl part, phenylalkyl with one to four carbon atoms in the alkyl part, carboxyl or carboxylic acid esters, in each case with one substituent containing one to 18 carbon atoms.

The compounds defined above can be manufactured analogously to processes which are in themselves known, which generally start from corresponding stilbene derivatives. As examples thereof, there may be mentioned:

A. Condensation of an acid chloride with approximately the two-fold molar amount of an aromatic nitrile, or optionally with an excess, in the presence of Friedel-Crafts catalysts — preferably aluminum chloride — at temperatures between 70° and 160°C, optionally in the presence of solvents, such as are usually employed for Friedel-Crafts reactions; [it being possible, under certain circumstances, for the nitrile to function as a solvent for the nitrilium salt (7)]. After cooling and dilution, the triazine ring is then closed whilst passing in ammonia.

The acid chlorides of the formula (5) required as starting material for this process can be manufactured according to known methods, for example as described in Swiss Patent Specification 420,046.

B. Condensation of approximately equimolar amounts of an aminophenol of the formula (8)
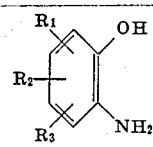

with an acid derivative of the formula (9)
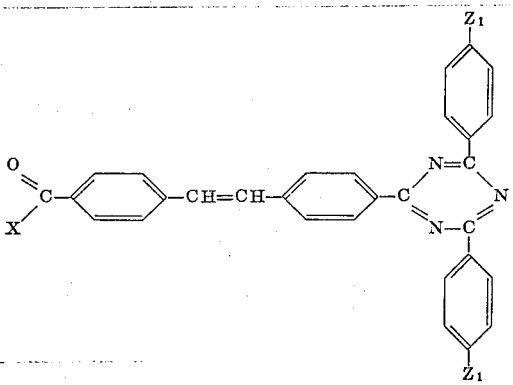

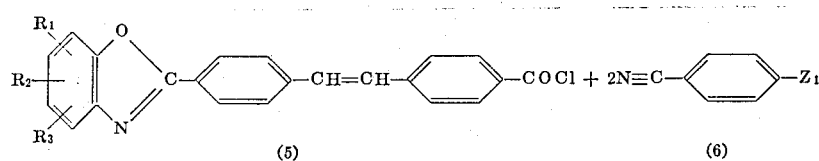

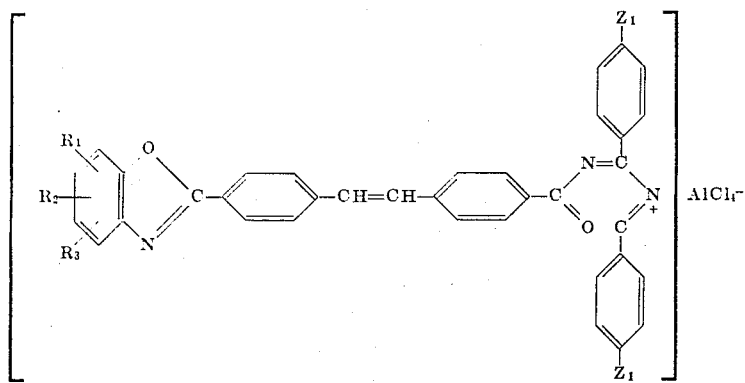

Formula (1)

wherein X represents halogen, hydroxyl or an alkoxy group (preferably methoxy group) — to give an acyl derivative of the formula (10)

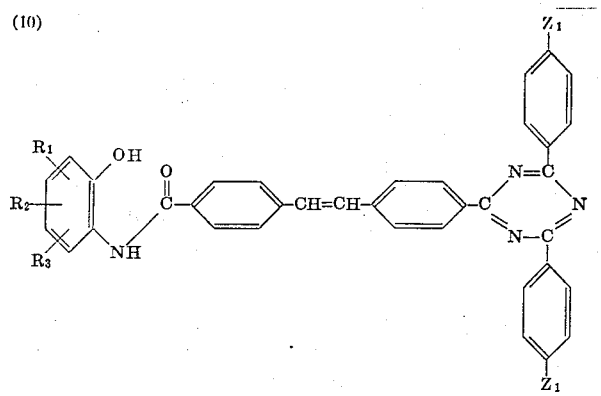

and subsequent cyclisation — optionally without isolation of the acyl derivative — to give the benzoxazole compound of the formula (1). The condensation is carried out analogously to procedures which are in themselves known, at temperatures of 120° to 350°C, optionally in the presence of condensation agents which eliminate water.

The acid derivatives of the formula (9) which are to be used as starting materials can, for example, be manufactured from the corresponding dicarboxylic acid half-ester chlorides according to process (a).

The synthesis of compounds according to the above process variant (B) can for example be effected in a single-stage process, starting from o-aminophenols of the formula (8) and carboxylic acid derivatives of the formula (9), by heating these components together to higher temperatures, appropriately between 120° and 350°C, in an inert gas (for example a stream of nitrogen). This reaction is preferably carried out in the presence of agents which eliminate water.

The synthesis can, however, also be carried out in two stages, by first condensing o-aminophenols of the formula (8) and carboxylic acid compounds of the formula (9) to give acyl compounds of the formula (10). For this, the carboxylic acid chlorides are appropriately used, and are condensed with the aminophenols at temperatures between 100° and 220°C, in the presence of an organic solvent, such as toluene, xylenes, chlorobenzene, dichlorobenzene, trichlorobenzene, chlorinated biphenyl or nitrobenzene and the acyl compounds obtained, of the formula (10), are then converted into the corresponding azole compounds at temperatures between 120° and 350°C, in the presence of a catalyst if appropriate. If carboxylic acid chlorides are used as starting substances, then these can be manufactured, immediately prior to the condensation with the o-amino compound, from the free carboxylic acid and thionyl chloride, optionally with the addition of a catalyst, such as pyridine, in the solvent wherein the condensation takes place thereafter, and can be employed further without isolation.

Suitable agents for eliminating water — including catalysts having the effect of eliminating water — are, for example, boric acid, boric anhydride, zinc chloride, p-toluenesulphonic acid, thionyl chloride, phosphorus oxychloride, phosphorus trichloride, and polyphosphoric acids, including pyrophosphoric acid. If boric acid is used as the catalyst, it is advantageously employed in an amount of 0.5 to 5 percent, relative to the total weight of the reaction composition. It is also possible conjointly to use high-boiling, polar, organic solvents, such as, for example, dimethylformamide, dichlorobenzene, trichlorobenzene, chlorinated biphenyl and aliphatic, optionally etherified, hydroxy compounds, for example propylene glycol, ethylene glycol monoethyl ether or diethylene glycol diethyl ether, and high-boiling esters of phthalic acid, such as, for example, phthalic acid dibutyl ester.

C. Reaction of a carboxylic acid of the formula (11)

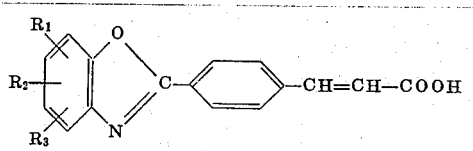

with a diazotised amine of the formula (12)

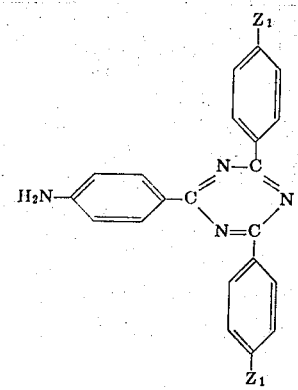

in the presence of cuprous chloride, in accordance with Meerwein's method.

D. Reaction of phosphorus compounds of the formula (13)

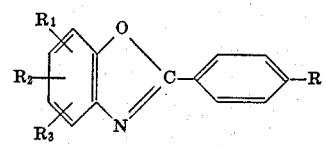

wherein R denotes the group $-CH_2-PO(O-Alkyl)_2$ or $-CH=P(Aryl)_3$, with aldehydes of the formula (14)

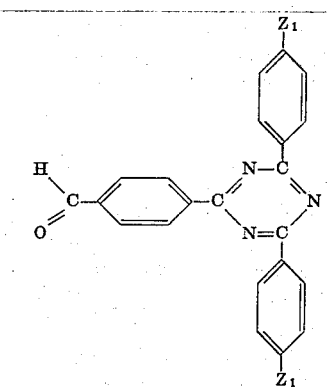

or reaction of aldehydes of the formula

(15) 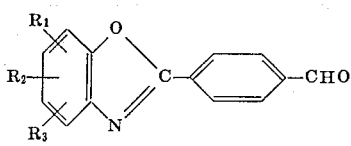

with phosphorus compounds of the formula

(16) 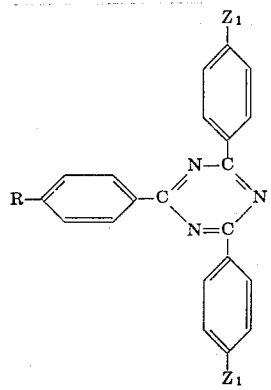

in accordance with the principle of the Horner synthesis of wittig synthesis.

The new compounds of the composition initially outlined possess a more or less pronounced fluorescence in the dissolved or finely divided state. They can be used for the optical brightening of the most diverse high molecular or low molecular organic materials, or materials containing organic substances.

The following groups of organic materials, where optical brightening thereof is relevant, may be mentioned as examples of the above, without the list which follows being intended to express any limitation thereof:

I. Synthetic organic high molecular materials:

a. Polymerisation products based on organic compounds containing at least one polymerisable carbon-carbon double bond, that is to say their homopolymers or copolymers, as well as their after-treatment products, such as, for example, crosslinking, grafting or degradation products, polymer blends and the like, as examples of which there may be mentioned:

Polymers based on $\alpha,\beta$-unsaturated carboxylic acids, especially on acrylic compounds (such as, for example, acrylic esters, acrylic acids, acrylonitrile, acrylamides and their derivatives or their methacrylic analogues), on olefine hydrocarbons (such as, for example, ethylene, propylene, isobutylene, styrenes and dienes, such as, especially, butadiene and isoprene, that is to say also rubbers and rubber-like polymers, as well as so-called ABS polymers), polymers based on vinyl and vinylidene compounds (such as, for example, vinyl esters, vinyl chloride, vinylsulphonic acid, vinyl esters, vinyl alcohol, vinylidene chloride or vinylcarbazole), on halogenated hydrocarbons (chloroprene or post-halogenated ethylenes), on unsaturated aldehydes and ketones (for example acrolein and the like), on allyl compounds and the like, graft polymerisation products (for example obtained by grafting-on vinyl monomers), crosslinking products (for example obtained by means of bifunctional or polyfunctional cross-linking agents, such as divinylbenzene, polyfunctional allyl compounds or bis-acrylic compounds), or compounds obtainable by partial degradation (hydrolysis or depolymerisation) or modification of reactive groupings (for example esterification, etherification, halogenation and self-crosslinking).

b. Other polymerisation products, such as, for example, those obtainable by ring opening, for example polyamides of the polycaprolactam type, as well as formaldehyde polymers, or polymers which are obtainable both through polyaddition and polycondensation, such as polyethers, polythioethers, polyacetals and thioplasts.

c. Polycondensation products or precondensates based on bifunctional or polyfunctional compounds possessing condensable groups, their homocondensation and co-condensation products, as well as after-treatment products, as examples of which there may be mentioned: polyesters, saturated (for example polyethylene terephthalate) or unsaturated (for example maleic acid-dialcohol polycondensates, as well as their crosslinking products with co-polymerisable vinyl monomers), unbranched as well as branched (including those based on polyfunctional alcohols, such as, for example, alkyd resins); polyamides (for example hexamethylenediamine adipate), maleate resins, melamine resins, phenolic resins (novolacs), aniline resins, furane resins, carbamide resins as well as their precondensates and products of analogous structure, polycarbonates, silicone resins and others.

d. Polyaddition products, such as polyurethanes (cross-linked and uncrosslinked) and epoxide resins.

II. Semi-synthetic organic materials, such as, for example, cellulose esters or mixed esters (acetate or propionate), nitrocellulose, cellulose ethers, regenerated cellulose (viscose or cuprammonium cellulose) or their after-treatment products, and casein plastics.

III. Natural organic materials of animal or vegetable origin, for example based on cellulose or proteins, such as wool, cotton, silk, bast, jute, hemp, furs and hair, leather, finely divided wood compositions, natural resins (such as calophony, especially lacquer resins), and also rubber, guttapercha, balata as well as their after-treatment products and modification products (for example obtained by curing, crosslinking or grafting), degradation products (for example obtained by hydrolysis or depolymerisation) and products obtainable by modification of reactive groups (for example by acylation, halogenation, crosslinking and the like).

The organic materials in question can be in the most diverse states of processing (raw materials, semi-finished goods or finished goods) and states of aggregation. They can, firstly, be in the form of the most diverse shaped structures, that is to say, for example, predominantly three-dimensional articles, such as blocks, sheets, profiles, pipes, injection mouldings or the most diverse machined articles, chips or granules, and foams; predominantly two-dimensional articles, such as films, foils, lacquers, strips, coatings, impregnations and coverings, or predominantly one-dimensional articles, such as filaments, fibres, flocks, bristles and wires. The said materials can, on the other hand, also be in an unshaped state, in the most diverse homogenous and inhomogeneous forms of division and states of aggregation, for example as powders, solutions, emulsions, dispersions and latices (examples: lacquer solutions, polymer dispersions, sols, gels, putties, pastes, waxes, glueing and filling compositions and the like).

Fibre materials can, for example, be in the form of endless filaments, staple fibres, flocks, hanks, texturised filaments, yarns, threads, fibre fleeces, felts, waddings, flocked structures or woven textile fabrics or textile laminates, knitted fabrics, and also paper, cardboards or paper compositions and the like.

The compounds to be used according to the invention are also of importance for the treatment of textile organic materials, especially woven textile fabrics. Where fibres, which may be present as staple fibres or endless fibres, in the form of hanks, woven fabrics, knitted fabrics, fleeces, flocked substrates or laminates, are to be optically brightened according to the invention, this is advantageously done in an aqueous medium, wherein the compounds in question are present in a finely divided form (a suspension, or solutions where appropriate). If desired, dispersing agents can be added during the treatment, such as, for example, soaps, polyglycol ethers of fatty alcohols, fatty amines or alkylphenols, cellulose sulphite waste lye or condensation products of optionally alkylated naphthalenesulphonic acid with formaldehyde. It provdes particularly suitable to carry out the process in a neutral, weakly alkaline or acid bath. Equally, it is advantageous if the treatment is carried out at elevated temperatures of about 50° to 100°C, for example at the boiling point of the bath or near the boiling point (about 90°C). Solutions in organic solvents can also be used for the finishing process according to the invention, as is for example practised for polyamide and polyester substrates in dyeing practice in so-called solvent dyeing (pad-thermofixing application, or exhaustion dyeing processes in drum dyeing machines).

The new optical brighteners to be used according to the invention can furthermore be added to, or incorporated in, the materials before or during their shaping. Thus, for example, it is possible to add them to the compression moulding composition or injection moulding composition in the case of the manufacture of films, foils, strips or mouldings, or to dissolve or disperse them in the spinning composition before spinning, or to take other steps to ensure homogeneous fine distribution. The optical brighteners can also be added to the starting substances, reaction mixtures or intermediate products for the manufacture of fully synthetic or semi-synthetic organic materials, that is to say also before or during the chemical reaction, for example in the case of a polycondensation (that is to say, also to precondensates), in the case of a polymerisation (that is to say, also to prepolymers) or in the case of polyaddition.

The new optical brighteners can of course also be employed in all cases where organic materials of the nature indicated above are combined with inorganic materials in any form (typical examples: detergents, and white pigments in organic substances).

The new optically brightening substances are distinguished by particularly good heat resistance, fastness to light and stability to migration.

The amount of the new optical brighteners to be used according to the invention, relative to the material to be optically brightened, can vary within wide limits. A distinct and durable effect is already achievable with very small amounts, in certain cases, for example, amounts of 0.001 per cent by weight. However, amounts of up to about 0.5 per cent by weight and above can also be employed. For most practical purposes, amounts between 0.01 and 0.2 per cent by weight are of preferential interest.

The new compounds serving as brighteners can for example also be employed as follows:

a. Mixed with dyestuffs or pigments, or as an additive to dyebaths and printing pastes, discharge pastes or reserve pastes. Also, for the after-treatment of dyeings, prints or discharge prints.

b. Mixed with so-called "carriers", antioxidants, light protection agents, heat stabilisers, and chemical bleaching agents, or as an additive to bleaching baths.

c. Mixed with crosslinking agents, dressings such as starch, or synthetically obtainable dressings. The products according to the invention can advantageously also be used to the liquors used for achieving a crease-proof finish.

d. In combination with detergents. The detergents and brighteners can be separately added to the wash baths to be employed. It is also advantageous to use detergents which contain the brighteners as an admixture. Suitable detergents are, for example, soaps, salts of sulphonate detergents, such as, for example, of sulphonated benzimidazoles substituted by higher alkyl radicals at the 2-carbon atom, and also salts of monocarboxylic acid esters of 4-sulphophthalic acid with higher fatty alcohols, as well as salts of fatty alcohol-sulphonates, alkylaryl-sulphonic acids or condensation products of higher fatty acids with aliphatic hydrosulphonic or aminosulphonic acids. Furthermore, non-ionic detergents can be employed, for example polyglycol ethers which are derived from ethylene oxide and higher fatty alcohols, alkylphenols or fatty amines.

e. In combination with polymeric carrier materials (polymerisation, polycondensation or polyaddition products), in which the brighteners are embedded in a dissolved or dispersed form, optionally in addition to other substances, for example in the case of coating agents, impregnating agents or binders (solutions, dispersions or emulsions), textiles, fleeces, paper and leather.

f. As additives to the most diverse industrial products, in order to make these more marketable or to avoid disadvantages in their usability, for example as an additive to glues, adhesives, toothpastes, paints and the like.

g. In combination with other optically brightening substances (for example for shade modification).

h. In spinning bath preparations, that is to say as additives to spinning baths such as are used to improve the slip for further processing of synthetic fibres.

The compounds of the initially mentioned formula can be used as scintillators, for various purposes of a photographic nature, such as for electrophotographic reproduction, or for supersensitisation.

If the brightening process is combined with other treatment methods or finishing methods, the combined treatment is advantageously carried out by means of appropriate stable preparations. Such preparations are characterised in that they contain optically brightening compounds of the general formula initially mentioned, as well as dispersing agents, detergents, carriers, dyestuffs, pigments or dressings.

When treating a series of fibre substrates, for example of polyester fibres, with the brighteners according to the invention, an appropriate procedure is to impregnate these fibres with the aqueous dispersions of the brighteners at temperatures below 75°C, for example at room temperature, and subject them to a dry heat treatment at temperatures above 100°C, it being generally advisable to dry the fibre material additionally beforehand at a moderately elevated temperature, for example at not less than 60°C, up to about 100°C.

The heat treatment in the dry state is then advantageously carried out at temperatures between 120° and 225°C, for example by warming in a drying chamber, by ironing within the indicated temperature range, or by treatment with dry superheated steam. The drying and dry heat treatment can also be carried out in immediate succession or can be combined into a single process stage.

EXAMPLE 1

20 ml of thionyl chloride are added dropwise over the course of about 30 minutes at 120°C, to a mixture of 12.0 g (0.03 mol) of the compound of the formula

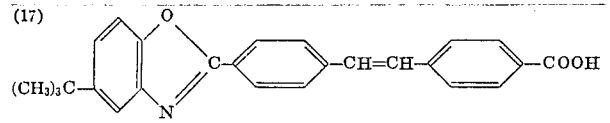

100 ml of chlorobenzene and 2 drops of pyridine. After the evolution of hydrochloric acid gas has ceased, the solution is evaporated to dryness in vacuo and the resulting carboxylic acid chloride of the formula

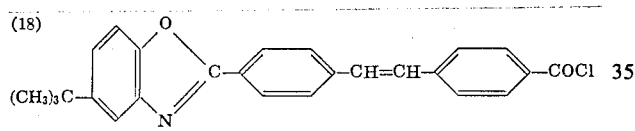

(melting point about 225°C) is heated with 30 ml of benzonitrile, 0.5 ml of thionyl chloride and 4.6 g of anhydrous aluminium chloride to 130°C. A dark red complex compound is thereby produced, which is stirred for a further hour at this temperature. After cooling to 80°C, the mixture is diluted with 100 ml of dry carbon tetrachloride and ammonia is passed in. Hereupon, the complex compound becomes completely decolourised and the mixture boils for a short time as a result of the heat of reaction generated. After cooling and adding 100 ml of methanol as well as 20 ml of concentrated hydrochloric acid, the mixture is filtered and the residue is washed with methanol and water until neutral, and dried. 12.0 g of the compound of the formula

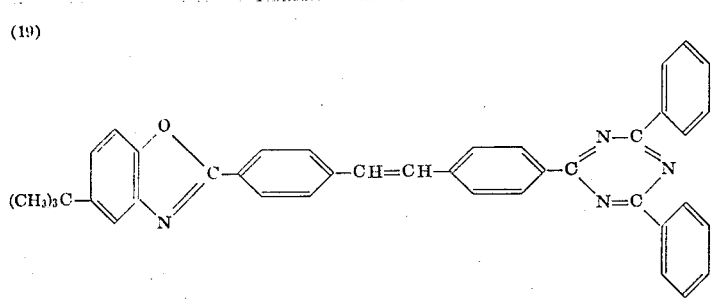

are obtained as a pale yellow powder which melts partially at 240°C. On recrystallising twice from dimethylformamide, using active charcoal and fuller's earth, 9.7 g of light yellow, glistening small needles of melting point 244°C (incomplete melting) are obtained.

EXAMPLE 2

Analgously to the description in Example 1, 4-(2-benzoxazolyl)-stilbene-4'-carboxylic acid yields in the compound of the formula

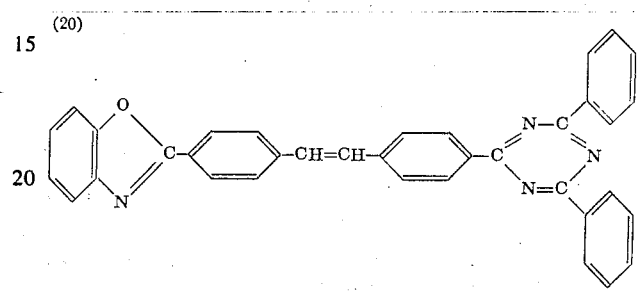

as luminous greenish-yellow crystals of melting point 298° to 299°C (crystallisation from dichlorobenzene and high vacuum sublimation).

EXAMPLE 3

A mixture of 9.7 g of the compound of the formula

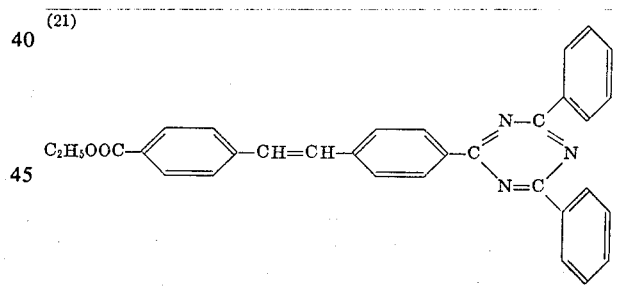

2.6 g of 2-amino-4-methylphenol and 30 ml of dichlorobenzene is heated for 1 hour under reflux, whilst passing nitrogen over it. After adding 80 ml of chlorinated biphenyl (Aroclor 1221, Monsanto) and 0.1 g of boric acid, the solution is heated for a further 4 hours, in the course of which 50 ml of solvent distil off together with liberated alcohol and water. In the course thereof, the internal temperature rises from 185°C to 290°C. The cooled mixture is diluted with 5 ml of dimethylformamide and filtered, and the residue is twice washed with 10 ml of dimethylformamide at a time. 4.2 g of a crude product of melting point 272° to 277°C are obtained. Purification by means of high vacuum sublimation, and crystallisation from dimethylformamide and xylene, yields luminous greenish-yellow crystals (melting point 284° to 289°C) of the product of the formula (22)

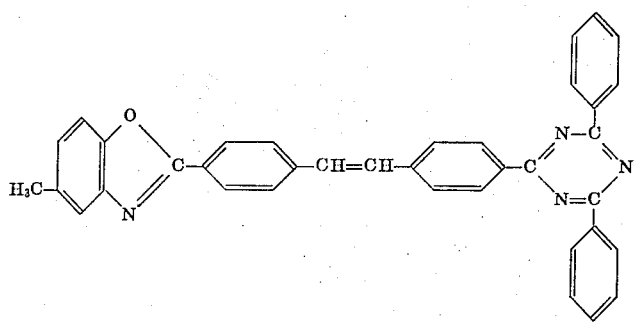

The compound of the formula (21) used as the starting product can be manufactured as follows:

63.0 g of stilbene-4-carboxylic acid ethyl ester-4'-carboxylic acid chloride of the formula

(23) C₂H₅OOC—⟨ ⟩—CH=CH—⟨ ⟩—COCl are heated with 124 g of benzonitrile, 3 ml of thionyl chloride and 30.3 g of aluminum chloride to 130°C for one hour. After cooling to 80°C, the mixture is diluted with 400 ml of dry carbon tetrachloride and the dark red complex compound is decolourised at 0° to 20°C by passing in ammonia. After adding 400 ml of methanol and acidifying with concentrated hydrochloric acid, the mixture is filtered and the residue is washed with methanol and water until neutral, and dried. 54.8 g of a yellow product of the formula (21) are obtained; after repeated recrystallisation from methylcellosolve the product crystallises in the form of pale greenish-yellow felted small needles of melting point 191°C.

EXAMPLE 4

A solution of 17.6 g of sodium hydroxide in 84 ml of water is added dropwise, with vigorous stirring, to a boiling mixture of 165 g of crude ethyl ester of the formula (21) in 1.65 l of dioxane. After 6 hours' refluxing, 850 ml of water are added and the mixture is acidified at room temperature with about 84 ml of concentrated hydrochloric acid. Thereafter the product is filtered off and the residue is washed with dioxane and then with water until neutral. After drying in vacuo, the crude carboxylic acid of the formula

(24) —HOOC—⟨ ⟩—CH=CH—⟨ ⟩—C⟨N-C(Ph)=N / N=C(Ph)⟩ is obtained as a pale yellow product. Melting point (after two recrystallisations from chlorobenzene) 321° to 325°C.

A suspension of 45.6 g of this crude carboxylic acid in 340 ml of tetrachloroethylene and 21.8 ml of thionyl chloride is heated to the reflux temperature over the course of half an hour and is stirred for one hour at this temperature. A little insoluble material is removed by hot filtration and the filtrate is evaporated to about 150 ml. After cooling, the precipitate if filtered off, washed with a little perchloroethylene and dried.

24.8 g of the acid chloride of the formula

(25) ClOC—⟨ ⟩—CH=CH—⟨ ⟩—C⟨N-C(Ph)=N / N=C(Ph)⟩ are obtained, and are purified by recrystallisation from tetrachloroethylene. Melting point 210°C.

7.1 g of this carboxylic acid chloride and 2.4 g of 2-amino-4-isopropylphenol in 50 ml of chlorinated biphenyl (Arochlor 1221, Monsanto) are stirred at 150° to 170°C. The acid amide of the formula (28)

(26) 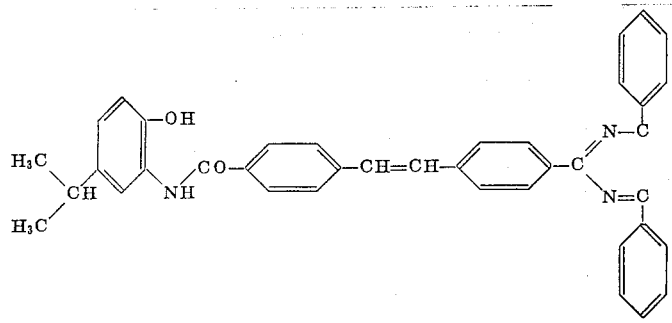

thereupon separates out in a voluminous form. After the evolution of hydrogen chloride has ceased, the mixture is heated for 3 hours to the boiling point, 275° to 285°C, whilst passing in nitrogen, and about 20 ml of solvent are distilled off together with the water formed. In the course of this, the acid amide dissolves completely, and after cooling to room temperature the benzoxazole crystallises out. This is filtered off, repeatedly washed with alcohol and dried.

5.0 g of a beige product of the formula

(27) 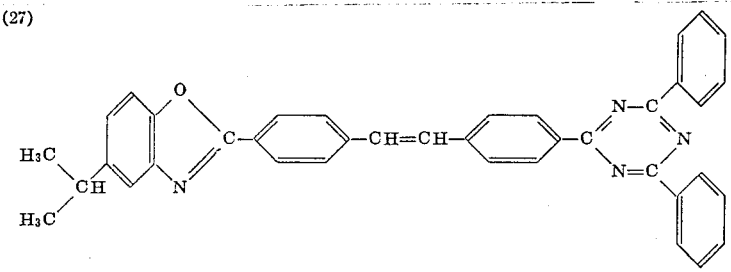

are obtained, which after recrystallisation from perchloroethylene melts at 259° to 263°C and after subsequent high vacuum sublimation melts indistinctly at about 200°C.

EXAMPLE 5

The following benzoxazoles of the formulae (29) to (33), corresponding to the general formula

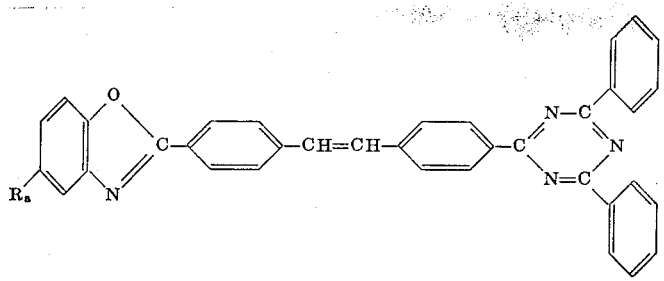

are obtained analogously to the description in Example 4.

| Formula | $R_a$ | Solvent for recrystallisation | Melting point °C |
|---|---|---|---|
| 29 | —Cl | Dimethylsulphoxide, Dichlorobenzene | 294 |
| 30 | —C(CH₃)₂—C₆H₅ | Methylcellosolve | 202 |
| 31 | —C₆H₅ | Dimethylformamide, Chlorobenzene | 289 |
| 32 | 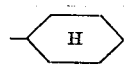 | Dimethylformamide, Chlorobenzene | 260 |

| 33 | 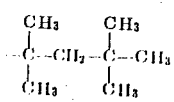 | Cyclohexane, Methylcellosolve | 200 |

EXAMPLE 6

Stilbene-4-carboxylic acid ethyl ester-4'-carboxylic acid chloride is converted into the corresponding triazine of the formula (34)

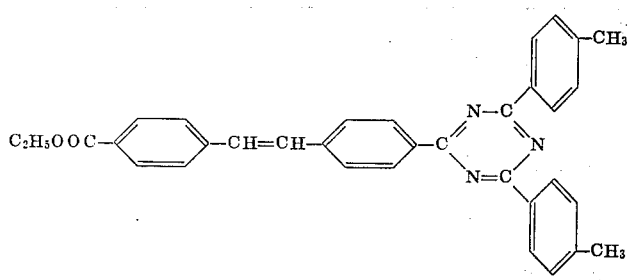

(melting point 198°C, recrystallised from glacial acetic acid), analogously to the preliminary stage of Example 3, but using p-tolunitrile. A solution of 0.8 g of sodium hydroxide in 4 ml of water is added dropwise, at the reflux temperature, to 8.0 g of this product in 80 ml of dioxane, whilst stirring. After boiling for three hours under reflux, the mixture is cooled and acidified with 10 ml of concentrated hydrochloric acid and the precipitate formed is filtered off. The residue is washed with water until neutral and dried. 7.4 g of the carboxylic acid of the formula (35)

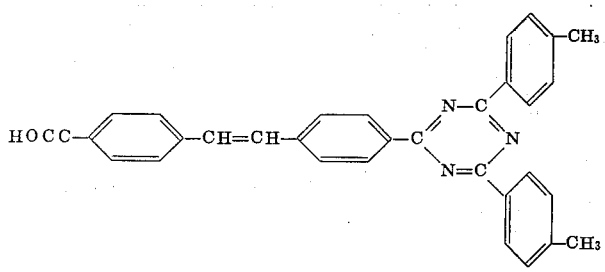

of melting point 222°C are obtained. This product is heated for one hour, at 115°C, in 30 ml of chlorinated biphenyl (Arochlor 1221, Monsanto), 15 ml of thionyl chloride and 0.15 ml of pyridine, whereupon it dissolves as the acid chloride. The excess of thionyl chloride is then removed at 115°C by applying a vacuum. 1.65 g of o-aminophenol are added to the solution and the temperature is raised to 150° – 170°C, whereupon the acid amide separates out in a voluminous form. After the evolution of hydrogen chloride has ceased, the mixture is heated for one hour to 280°C, whilst passing in nitrogen, and about 5 ml of the solvent are distilled off together with the water formed. In the course thereof the acid amide rapidly dissolves, and after cooling to room temperature the benzoazolyl compound crystallises. This is filtered off, repeatedly washed with dimethylformamide and toluene and recrystallised from dimethyl-formamide. 2.7 g of the product of the formula (36)

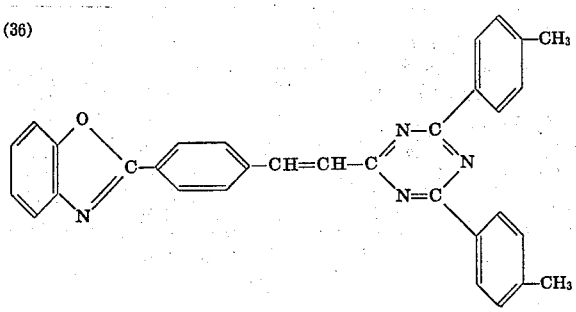

of melting point 306°C, are obtained in the form of light green small needles (after high vacuum sublimation and recrystallisation from chlorobenzene).

The benzoxazoles of the general formula (37)

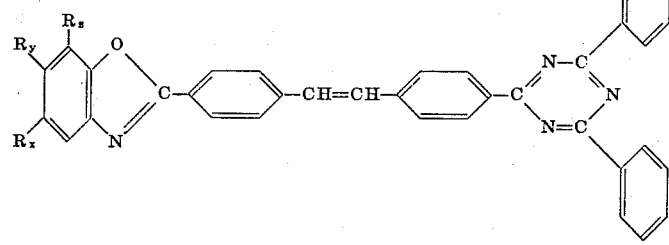

listed in the table which follows can also be manufactured in accordance with the instruments of the procedures which have been described.

| Formula | $R_x$ | $R_y$ | $R_z$ |
|---|---|---|---|
| 38 | —COOCH$_3$ | —H | —H |

| 39 | —CH₃ | —H | —CH₃ |
| --- | --- | --- | --- |
| 40 | —H | —H | —CH—CH₂—CH₃ (CH₃) |
| 41 | —CH₂—C₆H₅ | —H | —H |
| 42 | —SO₂CH₃ | —H | —H |
| 43 | —H | —H | —CH₃ |
| 44 | —Cl | —H | —CH₃ |
| 45 | —C(CH₃)₃ | —H | —CH₃ |
| 46 | —H | —CH₃ | —H |
| 47 | —(CH₂)₁₁—CH₃ | —H | —H |
| 48 | —COO(CH₂)₃—CH₃ | —H | —H |

EXAMPLE 7

100 parts of terephthalic acid-thylene glycol polyester granules are intimately mixed with 0.05 part of one of the compounds of the formulae (19), (20), (22) or (27) and fused at 285°C, whilst stirring. After spinning the spinning composition through customary spinnerets, strongly brightened polyester fibres of good fastness to light are obtained.

EXAMPLE 8

A woven polyester fabric (for example "Dacron") is padded with an aqueous dispersion which, per litre of liquor, contains 2 g of one of the compounds of the formulae (19), (20), (22), (27), (30), (31), (32) or (33) as well as 1 g of an addition product of about 8 mols of ethylene oxide and 1 mol of octylphenol. The material is dried at 70 to 80°C and developed by brief heating to 220°C. The woven fabric treated in this way is strongly brightened and shows good fastness to light.

EXAMPLE 9

A woven polyamide fibre fabric (Perlon) is introduced at 60°C, using a liquor ratio of 1:30 to 1:40, into an aqueous bath which (relative to the fabric weight) contains 0.2 percent of the compound of the formula (20), as well as containing, per litre, 1 g of 80 percent strength acetic acid and 0.25 g of an addition product of 30 to 35 mols of ethylene oxide to 1 mol of stearyl alcohol. The mixture is heated to the boil and kept at the boil for 30 minutes. After rinsing and drying, the fabric treated in this way shows a strong brightening effect.

EXAMPLE 10

10,000 parts of polyamide 6 granules are mixed with 30 parts of titanium dioxide (rutile modification) and 2 parts of one of the compound of the formulae (20) or (29) for 12 hours in a tumbler vessel. The mixture is fused whilst excluding atmospheric oxygen and the melt is spun in the usual manner. The filaments obtained show a strong brightening effect, with good fastness to light.

EXAMPLE 11

An intimate mixture of 100 parts of polyvinyl chloride, 3 parts of stabiliser (Advastat BD 100; Ba/Cd complex), 2 parts of titanium dioxide, 59 parts of dioctyl phthalate and 0.01 to 0.2 part of the compound of the formula (29) is milled on a calender at 150° to 155°C to give a film. The opaque polyvinyl chloride film thus obtained has a considerably higher white content than a film which does not contain the optical brightener.

EXAMPLE 12

100 parts of polystyrene and 0.1 part of the compound of the formula (29) are fused for 20 minutes at 210°C, with exclusion of air, in a tube of 1 cm diameter. After cooling, an optically brightened polystyrene composition of good fastness to light is obtained.

EXAMPLE 13

A 13 percent strength casting composition of acetylcellulose in acetone, which — relative to the plastics solid content — contains 2 percent anatase (titanium dioxide) as a delustering agent, as well as 0.04 percent of one of the compounds of the formulae (20) or (27), is poured onto a glass plate and spread by means of a metal rod to give a thin film. After drying, the film shows a significantly higher degree of whiteness than a film manufactured in the same manner which contains no optical brightener.

What we claim is:

1. A benzoxazole compound of the formula

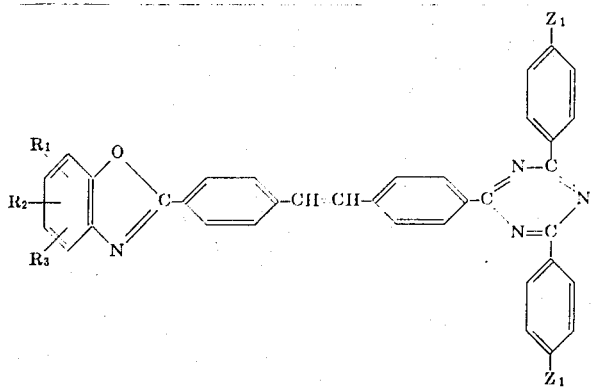

wherein $R_1$ and $R_2$ are identical or different and denote hydrogen, alkyl with one to five carbon atoms or chlorine, $R_3$ denotes hydrogen, alkyl with one to 12 carbon atoms, cyclohexyl, halogen, phenyl, alkylsulphonyl with one to four carbon atoms, sulphonic acid, sulphamoyl, phenylalkyl with one to four carbon atoms in the alkyl part, alkoxy with one to four carbon atoms, carboxyl, and carboalkoxy of one to 18 carbon atoms in the alkyl part, and wherein $R_1$, $R_2$ and $R_3$ in each case occupy the positions 5, 6 or 7, and wherein $Z_1$ denotes a hydrogen atom, a halogen atom, alkoxy, phenyl or an alkyl group containing one to eight carbon atoms.

2. A benzoxazole compound of claim 1, wherein $R_1$ denotes hydrogen, $R_2$ denotes hydrogen, alkyl with one to four carbon atoms or chlorine, $R_3$ denotes hydrogen, alkyl with one to 12 carbon atoms, halogen, phenyl, alkoxy with one to four carbon atoms, carboxyl, carbalkoxy of one to 18 carbon atoms in the alkyl part, sulphonic acid or sulphamoyl, and wherein $R_2$ and $R_3$ occupy the positions 5, 6 or 7, and wherein $Z_1$ denotes a hydrogen atom, a halogen atom or an alkyl group containing one to eight carbon atoms.

3. A benxoxazole compound of claim 1, wherein $R_1$ and $R_2$ are hydrogen, $R_6$ denotes hydrogen, alkyl with one to 12 carbon atoms, chlorine, phenyl, cyclohexyl, alkylsulfphonyl with one to four carbon atoms in the alkyl part, phenylalkyl with one to four carbon atoms in the alkyl part, carboxyl carbalkoxy of one to 18 carbon atoms in the alkyl part, and wherein $R_3$ can occupy the positions 5, 6 or 7, and wherein $Z_1$ denotes hydrogen or methyl.

4. A benzoxazole compound of claim 1, wherein $R_1$ and $R_2$ are hydrogen, $R_3$ denotes hydrogen, alkyl with one to 12 carbon atoms, chlorine, phenyl, cyclohexyl, alkylsulphonyl with one to four carbon atoms in the alkyl part, phenylalkyl with one to four carbon atoms in the alkyl part, carboxyl or carbalkoxy of one to 18 carbon atoms in the alkyl part, and $Z_1$ is hydrogen.

5. The benzoxazole compound according to claim 1, which corresponds to the formula

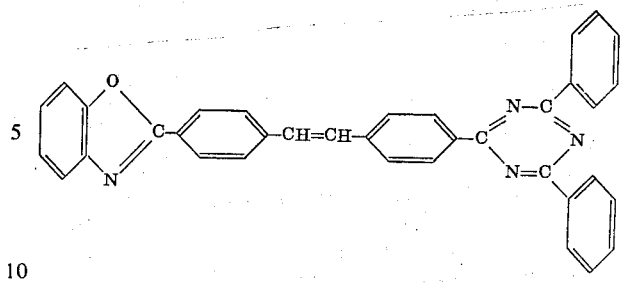

* * * * *

UNITED STATES PATENT AND TRADEMARK OFFICE
CERTIFICATE OF CORRECTION

PATENT NO. : 3,817,991
DATED : June 18, 1974
INVENTOR(S) : HANS RUDOLF MEYER AND ADOLF EMIL SIEGRIST It is certified that error appears in the above-identified patent and that said Letters Patent are hereby corrected as shown below:

Column 20, line 28, in the structural formula, insert a double bond between CH CH.

Column 20, line 62, delete "benxoxazole" and insert --- benzoxazole ---.

Column 20, line 65, delete "alkylsulfphonyl" and insert --- alkylsulphonyl ---.

Signed and Sealed this tenth Day of February 1976

[SEAL]

Attest:

RUTH C. MASON
Attesting Officer

C. MARSHALL DANN
Commissioner of Patents and Trademarks